United States Patent [19]
Blaurock et al.

[11] Patent Number: 5,959,131
[45] Date of Patent: Sep. 28, 1999

[54] NUTRITIONALLY SUPERIOR FAT FOR FOOD COMPOSITIONS

[75] Inventors: Allen E. Blaurock, Evanston; Ramanathapur G. Krishnamurthy, Glenview; Peter J. Huth, Buffalo Grove, all of Ill.

[73] Assignee: Kraft Foods, Inc., Northfield, Ill.

[21] Appl. No.: 08/568,140

[22] Filed: Dec. 7, 1995

[51] Int. Cl.[6] .................................................. C07C 57/00
[52] U.S. Cl. ........................ 554/227; 554/223; 426/601; 426/607; 426/608
[58] Field of Search .................................. 554/223, 227; 426/607, 608, 601

[56] References Cited

U.S. PATENT DOCUMENTS

| | | | |
|---|---|---|---|
| 4,610,889 | 9/1986 | Schmidt | 426/602 |
| 4,791,000 | 12/1988 | Holemans et al. | 426/606 |
| 4,844,940 | 7/1989 | Itagaki et al. | 426/607 |
| 4,883,684 | 11/1989 | Yang | 426/607 |
| 5,151,291 | 9/1992 | Tokairin et al. | 426/581 |
| 5,328,691 | 7/1994 | Horrobin et al. | 424/401 |
| 5,378,490 | 1/1995 | Wheeler et al. | 426/606 |
| 5,461,171 | 10/1995 | Heaton et al. | 554/224 |

FOREIGN PATENT DOCUMENTS

| | | |
|---|---|---|
| 0 462 290 A1 | 12/1991 | European Pat. Off. . |
| 58-094345 | 6/1983 | Japan . |
| 8026988 | 1/1996 | Japan . |
| WO 91/15578 | 10/1991 | WIPO . |
| WO 94/01565 | 1/1994 | WIPO . |
| WO 94/13814 | 6/1994 | WIPO . |

OTHER PUBLICATIONS

Nasirullah et al., Chem. Abstr, vol. 101, abstr No. 509221, 1984.
Fore et al., JAOCS, vol. 36, No. 10, pp. 490–491, 1960.
Steger et al., Rec. Trav. Chim., vol. 46, pp. 703–708, 1927.
Steger et al., Rec. Trav. Chim., vol. 46, pp. 703–708, "Derivatives of Petroselinic and Petroselidinic Acids," 1927.
Fore et al., Journal of the American Oil Chemists' Society, vol.36, No. 10, pp. 490–491, "Preparation of Petroselinic Acid,"1960.
E. A. Emken et al., "Metabolism of Meadowfoam Oil Fatty Acids in Mice", *Lipids,* vol. 26, No. 9, (1991) pp. 736–742.
N. Weber, et al. "Nutritional and Biochemical Studies on Monounsaturated Fatty Acids: Petroselinic Acid vs. Oleic Acid," *Inform.,* vol. 5, No. 4 (1994), p. 499.

*Primary Examiner*—Gary Geist
*Assistant Examiner*—Deborah D Carr
*Attorney, Agent, or Firm*—Fitch, Even, Tabin & Flannery

[57] ABSTRACT

A nutritionally superior fat for food compositions which comprises triglycerides containing cis-asymmetric monounsaturated fatty acids (cis-AMUFAs) is provided. The use of cis-AMUFA triglycerides provides a fat composition which is low in saturated fats and trans fatty acids with excellent textural properties and melting characteristics.

28 Claims, No Drawings

NUTRITIONALLY SUPERIOR FAT FOR FOOD COMPOSITIONS

The present invention relates to edible solid fats which have low saturated fat content and are essentially free of trans fatty acids. More particularly, the edible solid fat comprises triglycerides containing one or more cis-asymmetric monounsaturated fatty acids. Preferably, the edible solid fat comprises triglycerides containing three cis-asymmetric monounsaturated fatty acids.

BACKGROUND OF THE INVENTION

Fats and oils are the most commonly occurring lipids and are a major source of dietary energy. Fats and oils aid in making both natural and prepared food more palatable by improving the texture and by providing a more desirable flavor.

Fats and oils are triacylglycerides or triglycerides formed from the reaction of fatty acids with glycerol as follows:

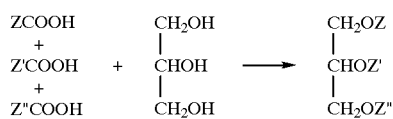

where Z is an organic radical containing about 2 to 24 carbon atoms. The distinction between a fat and an oil is arbitrary. At room temperature a fat is a solid and an oil is liquid. The physical characteristics of fat depend on the distribution of fatty acids on the triglyceride molecules.

Metabolically, ingested triglycerides are hydrolyzed in the small intestines to 2-monoacylglycerides and fatty acids which are then reesterified to triglycerides in the enterocyte of the intestinal wall, absorbed into the blood, and transported In chylomicron vesicles. The body utilizes these triglycerides to form other lipid compounds such as eicosenoids and cholesterol esters, or as a source of energy.

The effects of dietary fatty acids on cholesterol metabolism is of particular interest due to reports which link high levels of cholesterol in the blood (hypercholesterolemia) with arterial disease. Many authorities consider elevated plasma cholesterol a major risk factor in cardiovascular disease.

Low fat diets have long been known to be an effective means for lowering the plasma cholesterol level in humans, and thereby lowering the risk of hypercholesterolemia (Keys et al., *Science* 112 (1950) 79). Further, research has suggested that the quality of ingested fats influences serum-cholesterol levels. For example, the intake of saturated fatty acids containing 12 to 16 carbon atoms produced increased serum choiesterol levels in humans, whereas, unsaturated fatty acids were found to lower serum cholesterol levels (Keys et al., *Metabolism* 14 (1965) 747).

Saturated fatty acids (SAFA) from animal fats and plant sources and trans fatty acids (TFA) from partially hydrogenated vegetable oils are routinely used in food products because of their high melting points. The partial hydrogenation of vegetable oils has been the preferred method for developing fats with sufficient hardening characteristics and desired functionalities for use in shortenings, margarines, and other food compositions. Nutritional studies have suggested that TFA from partially hydrogenated vegetable oils may raise LDL-cholesterol to a similar degree as C12:0 to C16:0 fatty acids, whereas stearic acid (C18:0), cis-monounsaturated fatty acids (e.g., oleic acid), and cis-polyunsaturated fatty acids (e.g., linoleic acid) do not. See, for example, Hegsted et al., *Amer. J. Clin. Nutr.* 17 (1965) 281; Derr et al., *Metabolism* 42 (1993) 130; Mensink et al., *N. Eng. J. Med.* 323 (1990) 439.

Efforts have been made to provide fat compositions that balance the desire for lower saturated fat and low trans fatty acids with the need to provide compositions with acceptable physical properties. Current lipid-based technologies for replacing trans fatty acids typically involve the use of saturated fats and hydrogenation in order to attain desired characteristics. For example, U.S. Pat. No. 4,610,899 to Schmidt describes fat blends having relatively low levels of trans fatty acids. However, these fats were produced by random interesterification of lauric fats, saturated fats and a minor proportion of partially hydrogenated fats. The use of asymmetric monounsaturated fatty acids (AMUFAs) to provide a solid edible fat low in saturated fat and free of trans fatty acids is not described.

SUMMARY OF THE INVENTION

The present invention provides a nutritionally superior fat for food compositions which comprises triglycerides containing at least one cis-asymmetric monounsaturated fatty acids (cis-AMUFAs). Preferably the triglycerides of this invention contain at least two cis-AMUFAs (which may be the same or different). More preferably the triglycerides of this invention contain three cis-AMUFAs (which may be the same or different). The use of cis-AMUFAs to replace trans fatty acids and saturated fatty acids in the triglycerides provides products which are nutritionally superior and which have excellent textural properties and melting characteristics. Further, triglycerides containing cis-AMUFAs provide a fat composition with desirable nutritional characteristics as they do not raise the levels of LDL-cholesterol, they are metabolized similarly to other fatty acids, and they provide no adverse biological effects. The fatty acids utilized to produce the triglycerides of the invention are typically found in nature and do not require trans fatty acids to attain desirable hardening characteristics, and as such, can be utilized in tablespreads, shortenings, confectionery fats, frying fats and the like.

The fat composition of the present invention comprises triglycerides containing at least one cis-asymmetric monounsaturated fatty acids. Thus, the triglycerides of this invention may contain one, two, or three cis-asymmetric monounsaturated fatty acids. Examples of such fatty acids include petroselinic acid (PSA) and other cis-unsaturated fatty acids. The fat composition of this invention contains more than about 79 weight percent unsaturated fatty acids, a trans fatty acid content of less than about 5 weight percent, and a melting point of about 20° to about 40° C. Trans fatty acids are not required in the compositions of this invention because of the generally high melting points of the cis-AMUFA components.

It is an object of this invention to provide an edible fat having desirable melting properties and having acceptable taste and mouthfeel characteristics when incorporated into a wide variety of food compositions.

It is another object of this invention to provide a fat composition of cis-AMUFA-triglycerides and food compositions incorporating them.

Still another object of this invention is to provide an edible fat composition comprising an edible triglyceride containing cis-asymmetric monounsaturated fatty acids, wherein the triglyceride contains more than about 79 weight percent unsaturated fatty acids, a trans fatty acid content of less than about 5 weight percent, and a melting point of about 20° to about 40° C.

Another object of this invention is to provide an edible fat blend comprising a triglyceride containing at least one cis-asymmetric monounsaturated fatty acid, wherein the triglyceride contains greater than about 79 weight percent unsaturated fatty acids, a trans fatty acid content of less than about 5 weight percent, and a melting point of about 20° to about 40° C.

It is a further object of this invention to provide a food composition containing an edible fat, the edible fat comprising a triglyceride having at least one cis-asymmetric monounsaturated fatty acid, wherein the triglyceride contains more than about 79 weight percent unsaturated fatty acid, a trans fatty acid content of less than about 5 weight percent, and a melting point of about 20° to about 40° C.

Other objects, advantages, features, and characteristics of the present invention will become more apparent upon consideration of the following description and the appended claims.

DETAILED DESCRIPTION OF THE INVENTION

The edible fat compositions of the present invention contain a triglyceride having cis-asymmetric monounsaturated fatty acids. Preferably, the edible fat compositions of the present invention contain about 2 to 90 weight percent, and more preferably about 5 to 20 weight percent, of a triglyceride containing cis-18:1 asymmetric monounsaturated fatty acids. As used herein, the term "cis-asymmetric monounsaturated fatty acids" (cis-AMUFAs) refers to fatty acids with about 16 to about 24 carbons, having a double bond occurring between any two carbons along the fatty acid chain except the central carbon. For purposes of this invention, the central carbon of an even numbered fatty acid is the middle carbon; and for an odd numbered fatty acid, it is either of the two middle carbon atoms. More preferably, the cis-AMUFAs have a single double bond within about 2 to 6 carbon atoms of either end of the fatty acid residue. Even more preferably, the cis-AMUFAs have a single double bond within about 2 to 6 carbon atoms from the carboxylic acid end of the fatty acid residue. The triglycerides of this invention have less than about 5 weight percent trans double bonds, preferably less than about 2 weight percent trans double bonds, and most preferably less than about 1 weight percent trans double bonds. Cis-AMUFAs have melting points higher than fatty acids with the same carbon chain lengths but having the central carbon atom or atoms associated with the double bond.

Fatty acid starting materials for cis-AMUFA triglyceride preparations may be isolated from natural sources or obtained commercially. Natural sources may include plants where AMUFAs naturally occur or plants which have been altered through classical genetic breeding or through biotechnological methods to contain AMUFAs. As used herein the fatty acid acyl groups are given the following designation, $x:y^{\Delta n}$, where x is the number of carbon atoms, y is the number of double bonds, and n is the carbon number where the double bond occurs. For example, cis-petroselinic acid, which has a double bond between the 5th and 6th carbons from the carboxyl end, is designated $18:1^{\Delta 6,cis}$.

AMUFAs useful in the present invention generally include fatty acid residues such as cis-octadecenoic acid, cis-5-eicosenoic acid, cis-13-docosenoic acid, cis-15-tetracosenoic acid, and the like. Cis-AMUFA triglycerides containing mixtures the same or different fatty acid residues are suitable for use in this invention. Table 1 sets forth some specific cis-AMUFAs and their sources.

TABLE 1

Sources of cis-AMUFAs.

| Fatty Acid | Symbol | Structure | Source Oil |
|---|---|---|---|
| petroselinic | $18:1^{\Delta 6,cis}$ | $CH_3(CH_2)_{11}CH=CH(CH_2)_3COOH$ | coriander |
| 5-eicosenoic | $20:1^{\Delta 6,cis}$ | $CH_3(CH_2)_{14}CH=CH(CH_2)_2COOH$ | meadowfoam |
| erucic | $22:1^{\Delta 3,cis}$ | $CH_3(CH_2)_{18}CH=CHCOOH$ | meadowfoam |

Varieties of coriander seeds containing 19% oil with 60% or more petroselinic acid are commercially available.

Triglycerides making up the cis-AMUFA portion of the fat composition of this invention may be prepared using synthetic procedures known to those skilled in the art, such as, for example, directly esterifying glycerol or transesterifying glycerol lower alkyl esters with fatty acids, fatty acid esters, fatty acid halides, or fatty acid anhydrides. Cis-AMUFA triglycerides may also be prepared using enzymatic esterification methods known in the art.

A triglyceride prepared using cis-AMUFAs will have the following general formula

wherein at least one of the R, R' and R" groups, which may be the same or different, is a cis-asymmetric monounsaturated fatty acid (cis-AMUFA) residue of about 16 to about 24 carbons, and wherein each cis-AMUFA residue has a double bond which does not involve the central carbon of the cis-AMUFA residue and wherein the triglyceride contains less than about 5 weight percent trans double bonds. Hence, the triglycerides of this invention may have fatty acid groups which are all the same or which are different in one or all three positions of the triglyceride. At least one of the fatty acid groups (R, R', and R") must be a cis-AMUFA group. When two or three of the fatty acid groups are cis-AMUFAs, they may be the same or different. The other, non-cis-AMUFA groups may be, for example, saturated fatty acid groups containing 2 to 24 carbon atoms or polyunsaturated fatty acid groups containing about 18 to 22 carbon atoms and 2 to 6 double bonds. The other, non-cis-AMUFA groups may also include monounsaturated trans-fatty acid groups so long as the quantity of trans double bonds in the triglyceride does not exceed the maximum allowable amount (i.e., does not exceed about 5 weight percent). Examples of triglycerides of the invention include, but are not limited to, tripetroselinin, trieicosenoin, trinervonin, tridocosenoin, and trierucin. More preferably, the cis-AMUFAs have a single double bond within about 2 to 6 carbon atoms of either end of the fatty acid residue. Even more preferably, the cis-AMUFAs have a single double bond within about 2 to 6 carbon atoms from the carboxylic acid end of the fatty acid residue. The triglycerides of this invention contain less than about 5 weight percent, preferably less than about 2 weight percent, and most preferably less than about 1 weight percent trans double bonds.

The use of cis-AMUFAs to form triglycerides provides fat compositions with a hardness sufficient for use in table spreads, shortenings, confectionery fats, frying fats and the like, without the need for trans fatty acids or saturated fatty acids. Typically, the production of trans fatty acids requires the partial hydrogenation of vegetable oil fatty acids with hydrogen gas in the presence of a catalyst at high temperatures and pressures. Hence, the use of cis-AMUFAs according to the present invention avoids the need for partially hydrogenated vegetable oils.

In accordance with the present invention, the fat composition may be a single type of cis-AMUFA triglyceride or a blend of different types of cis-AMUFA triglycerides. In addition, the cis-AMUFA triglyceride or cis-AMUFA triglyceride blend may be further blended with other fats and oils to provide the desired product characteristics for a particular food composition. These food compositions preferably contain about 2 to 90 weight percent of the cis-AMUFA triglycerides, and more preferably about 5 to 20 weight percent of the cis-AMUFA triglycerides.

The fat compositions of the present invention provide significant versatility such that they can be utilized in a number of applications, including but not limited to those set forth herein. The triglycerides of the invention can be employed as fat replacements in fat-containing edible emulsions comprising an oil phase and an aqueous phase, including those high in fat, such as margarines, salad dressings, and confections such as chocolate and those high in water, such as low fat spreads. The triglycerides of this invention can be employed as full or partial fat substitutes in dairy, meat, nut, egg, and other food products having a high natural fat component, and in vegetable, cereal and other products having a low natural fat component. The triglycerides of this invention can be employed as ingredients for all types of leavened baked products, both yeast raised and chemically leavened, and unleavened baked products, and as coatings or coating ingredients for the same types of products The triglycerides of this invention can be employed as an ingredient or a coating for snack food products, as well as a frying oil or a frying oil ingredient for fried snacks. In addition, the fat composition of the present invention can be employed to form edible barrier layers, either on the exposed surface of foods or as internal barrier layers used to separate various portions of a food product, e.g. in frozen pizza, nut coatings, or as a barrier between a dessert filling and an outer edible shell in fruit filled cookies and the like.

Representative of fat-containing food products which can contain, in addition to other food ingredients, the fat composition of this invention in full or partial replacement of natural of synthetic fat include, but are not limited to, frozen desserts, e.g. frozen novelties, ice cream, sherbet, ices, and milk shakes; salad dressings; mayonnaise and mustards; dairy and non-dairy cheese spreads; flavored dips; flavored bread or biscuit spreads; filled dairy products such as filled cream and filled milk; frying fats and oils; cocoa butter replacements and blends; candy, especially fatty candies such as those containing peanut butter or chocolate (to which antibloom properties may be imparted); reformed and comminuted meats; meat substitutes and extenders; egg products and substitutes; nut products such as peanut butter; vegetable and fruit products; pet foods; whipped toppings; compound coatings; coffee lighteners, liquid and dried; puddings and pie fillings; frostings and fillings; chewing gum; breakfast cereals; bakery products, e.g., cakes, breads, rolls, pastries, cookies, biscuits, and savory crackers; and ingredient mixes or premixes of any of these. The fat composition of this invention may also be employed in any flavor, nutrient, drug or functional additive delivery system.

The following examples illustrate methods for carrying out the invention and should be understood to be illustrative of, but not limiting upon, the scope of the invention which is defined in the appended claims.

EXAMPLES

Example 1
Enzymatic Esterification of Petroselinic Acid.

Petroselinic acid ($18:1^{\Delta 6,cis}$; 38.83 mmols, 10.97 g; Nu Chek Prep, Elysian, Minn.) and glycerol (11.09 mmols, 1.12 g; Sigma Chemical Co., St. Louis, Mo.) were combined with lipozyme (3 g; IM-60, Novo Nordisk, Danbury, Conn.). The mixture was incubated in a rotoevap flask apparatus (Buchi) at 60° C. under vacuum for about 79 hours. The tri-, di-, and monoglyceride composition of the reaction mixture was monitored using HPLC. Table 1 shows the formation of various components throughout the reaction.

TABLE 1

Esterification of Petroselinic Acid

| Time (hrs) | Triglycerides | (weight %) Diglycerides | Monoglycerides |
|---|---|---|---|
| 0 | 0.0 | 0.0 | 0.0 |
| 2.0 | 16.4 | 82.6 | 1.1 |
| 5.0 | 34.8 | 62.6 | 2.7 |
| 8.0 | 55.3 | 43.4 | 1.3 |
| 23.0 | 87.5 | 12.4 | 0.2 |
| 29.0 | 89.3 | 10.5 | 0.2 |
| 31.0 | 91.7 | 8.2 | 0.2 |
| 47.0 | 89.0 | 10.7 | 0.2 |
| 56.0 | 88.1 | 11.6 | 0.3 |
| 59.0 | 85.6 | 11.4 | 0.4 |
| 71.0 | 88.6 | 10.9 | 0.5 |
| 79.0 | 89.5 | 10.3 | 0.3 |

Example 2
Enzymatic Esterification of 5-Eicosenoic Acid.

5-Eicosenoic Acid (38.83 mmols, 12.06 g; Nu Chek Prep., Elysian, Minn.) and glycerol (11.09 mmols, 1.12 g) were combined with 3 g lipozyme. Unless specified otherwise, all reactants were the same as used in Example 1. The mixture was incubated in a rotoevap flask as described in Example 1 for 71 hours and monitored by HPLC. The results for the formation of trieicosenoin are shown in Table 2 below.

TABLE 2

Esterification of 5-Eicosenoic Acid

| Time (hrs) | Triglycerides | (weight %) Diglycerides | Monoglycerides |
|---|---|---|---|
| 0 | 0.0 | 0.0 | 0.0 |
| 6.0 | 15.3 | 65.2 | 19.5 |
| 22.0 | 66.0 | 29.3 | 4.7 |
| 26.0 | 65.5 | 31.5 | 3.0 |
| 31.0 | 73.9 | 23.9 | 2.3 |
| 46.0 | 85.0 | 14.5 | 0.5 |
| 54.0 | 85.7 | 14.0 | 0.4 |
| 71.0 | 88.1 | 11.1 | 0.2 |

Example 3
Enzymatic Esterification of Petroselinic and Stearic Acids.

Petroselinic acid (186.68 mmols, 52.73 g), stearic acid (18:0, 9.82 mmols, 2.79 g; Nu Chek Prep., Elysian, Minn.) and glycerol (59.0 mmols, 5.43 g) were combined with 15 g lipozyme. Unless specified otherwise, all reactants were the same as used in Example 1. The molar ratio of petroselinic acid to stearic acid was about 95 to 5. The mixture was incubated in a rotoevap flask as described in Example 1 for 72 hours. After incubation, the composition contained about 93.5 weight percent triglycerides, 5.8 weight percent diglycerides, and 0.7 weight percent monoglycerides.

Example 4
Preparation of Baked Goods.

This example illustrated the preparation of various baked goods with tripetroselinin as prepared in Example 1. A puff pastry was prepared using the following formula:

| | |
|---|---|
| Flour (all purpose) | 16 oz |
| Cold water | 8 oz |
| Fat | 16 oz |
| Salt | 0.25 oz |

The fat consisted of about 60 percent canola oil and about 40 percent tripetroselinin. A portion of the flour (12 oz) and fat (about 4 oz) and all of the salt was blended with water to form a coarse mealy dough and mixed to a smooth consistency After forming, the dough was refrigerated overnight. The remaining flour and fat were folded into the dough and the refrigerated for two hours. The finished dough was rolled into small individual pastry layers and baked at 400° F. for 20 minutes. The resulting puff pastry was flaky with a light medium brown color, flaky exteriors and light interior. Flavor was similar to a control prepared with butterfat. Overall, the canola/tripetroselinin fat system produced a pastry which properties similar to the butterfat control.

A pie crust was prepared using the following formula:

| | |
|---|---|
| Flour (all purpose) | 136.5 g |
| Water | 50.0 g |
| Fat | 110.0 g |
| Salt | 1.0 g |

The fat consisted of about 60 percent canola oil and about 40 percent tripetroselinin. The flour, fat, and salt were mixed with the slow addition of water to form a coarse meal. The mixture was kneaded for about 3 to 5 minutes to thoroughly blend the ingredients. After chilling for about 30 minutes, the dough was formed in a pie pan. The formed dough was covered with foil, weighed down to prevent rising, and then baked at 350° F. for 10 minutes. The foil was then removed and baking was continued for an additional 10 minutes. The resulting pie crust had similar taste characteristics and better texture characteristics (i.e., crispier) than a control prepared with butter.

Example 5
Preparation of Tablespreads.

A series of tablespreads were prepared using various fats and the following formula:

| | |
|---|---|
| Part A: | |
| Fat | 81.3 g |
| Part B: | |
| Water | 16.0 g |
| Salt | 2.0 g |
| Polyglycerol dipamitate | 0.4 g |
| β-apocarotenal | 0.02 g |
| Lecithin | 0.2 g |
| Butter flavor | 0.04 g |

The various fats forming Part A were heated to 70° C. and then transferred to a chilled surface high speed blending unit. Part B ingredients were then sequentially added. Ingredients were chilled (about 8° C.) with mixing until crystallization occurred and then held until the desired firmness was obtained.

Margarines using four different fats were prepared and evaluated. The following fats were used:
 fat 1 (control): 84% canola and 16% cottonseed oil stearine;
 fat 2: 84% canola, 14% cottonseed oil stearine, and 2% tripetroselinin;
 fat 3: 80% canola, 8% cottonseed oil stearine, and 12% tripetroselinin; and
 fat 4: 92% coriander oil (about 65–70% petroselinic acid) and 8% cottonseed oil stearine.
The results are presented in Table 3.

TABLE 3

Margarines.

| | Fat 1 | Fat 2 |
|---|---|---|
| Appearance | Sl. graininess; Stiff/creamy at temp. | Smoother; Creamy at room temp. |
| Spreadability | Smooth | Smooth |
| Mouthfeel | Grainy | Grainy |
| Texture | Grainy | Smooth and creamy |
| Melting (at 37°) | Slow | Quick |
| Overall rank | Fair | Fair |
| | Fat 3 | Fat 4 |
| Appearance | Sl. graininess; Smooth/creamy at room temp. | Very smooth; Stiff at room temp. |
| Spreadability | Very smooth | Pasty |
| Mouthfeel | Smooth, very quick | Smooth |
| Texture | Smooth | Course |
| Melting (at 37°) | Quickest | Fast |
| Overall rank | Best | Poor |

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method of preparing a nutritionally superior food product, said method comprising incorporating into a food product, in place of at least a portion of a conventional fat, an edible, nutritionally superior fat composition or fat blend comprising an edible triglyceride having the following formula

wherein at least one of the R, R', and R" groups is a cis-asymmetric monounsaturated fatty acid residue of about 16 to 24 carbons, wherein each cis-asymmetric monounsaturated fatty acid residue, which may be the same or different, has a single double bond within about 2 to about 6 carbon atoms of either end of the cis-asymmetric monounsaturated fatty acid residue, wherein the triglyceride contains more than about 79 weight percent unsaturated fatty acids, a trans fatty acid content of less than about 5 weight percent, and a melting point of about 20° to about 40° C. and wherein the triglyceride is an nutritionally superior fat which, when incorporated into the food product, provides excellent textural properties and does not significantly raise LDL-cholesterol levels in humans consuming the food product.

2. The method according to claim 1, wherein at least two of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

3. The method according to claim 1, wherein each of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

4. The method according to claim 1, wherein the cis-asymmetric monounsaturated fatty acid residue is selected from the group consisting of cis-6-octadecenoic acid, cis-5-eicosenoic acid, cis-13-docosenoic acid, cis-15-tetracosenoic acid, and mixtures thereof.

5. The method according to claim 1, wherein the triglyceride is selected from the group consisting of tripetroselinin, trieicosenoin, trinervonin, tridocosenoin, trierucin, and mixtures thereof.

6. An edible, nutritionally superior fat composition comprising an edible triglyceride having the following formula

wherein at least one of the R, R', and R"° groups is a cis-asymmetric monounsaturated fatty acid residue of about 16 to 24 carbons, wherein each cis-asymmetric monounsaturated fatty acid residue, which may be the same or different, has a single double bond within about 2 to about 6 carbon atoms of either end of the cis-asymmetric monounsaturated fatty acid residue, wherein the triglyceride contains more than about 79 weight percent unsaturated fatty acids, a trans fatty acid content of less than about 5 weight percent, and a melting point of about 20° to about 40° C., and wherein the triglyceride is an nutritionally superior fat which, when incorporated into food products, provides excellent textural properties and does not significantly raise LDL-cholesterol levels in humans consuming the food products.

7. The composition according to claim 6, wherein at least two of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

8. The composition according to claim 6, wherein each of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

9. The composition according to claim 6, wherein the cis-asymmetric monounsaturated fatty acid residue is selected from the group consisting of cis-6-octadecenoic acid, cis-5-eicosenoic acid, cis-13-docosenoic acid, cis-15-tetracosenoic acid, and mixtures thereof.

10. The composition according to claim 6, wherein the triglyceride Is selected from the group consisting of tripetroselinin, trieicosenoin, trinervonin, tridocosenoin, trierucin, or mixtures thereof.

11. An edible, nutritionally superior fat blend comprising an edible triglyceride having the following formula

wherein at least one of the R, R', and R" groups is a cis-asymmetric monounsaturated fatty acid residue of about 16 to 24 carbons, wherein each cis-asymmetric monounsaturated fatty acid residue, which may be the same or different, has a single double bond within about 2 to about 6 carbon atoms of either end of the cis-asymmetric monounsaturated fatty acid residue, wherein the triglyceride contains more than about 79 weight percent unsaturated fatty acids, a trans fatty acid content of less than about 5 weight percent, and a melting point of about 20° to about 40° C., and wherein the triglyceride is an nutritionally superior fat which, when incorporated into food products, provides excellent textural properties and does not significantly raise LDL-cholesterol levels in humans consuming the food products.

12. The edible fat blend according to claim 11, wherein at least two of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

13. The edible fat blend according to claim 11, wherein each of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

14. The edible fat blend according to claim 11, wherein the cis-asymmetric monounsaturated fatty acid residue is selected from the group consisting of cis-6-octadecenoic acid, cis-5-eicosenoic acid, cis-13-docosenoic acid, cis-15-tetracosenoic acid, and mixtures thereof.

15. The edible fat blend according to claim 11, wherein the triglycerides are selected from the group consisting of tripetroselinin, trieicosenoin, trinervonin, tridocosenoin, trierucin, and mixtures thereof.

16. The edible fat blend according to claim 11, further containing canola oil.

17. The edible fat blend according to claim 16, further containing cottonseed oil stearine.

18. A food composition containing an edible, nutritionally superior fat, the edible fat comprising an edible triglyceride having the following formula

wherein at least one of the R, R', and R" groups is a cis-asymmetric monounsaturated fatty acid residue of about 16 to 24 carbons, wherein each cis-asymmetric monounsaturated fatty acid residue, which may be the same or different, has a single double bond within about 2 to about 6 carbon atoms of either end of the cis-asymmetric monounsaturated fatty acid residue, wherein the triglyceride contains more than about 79 weight percent unsaturated fatty acids, a trans fatty acid content of less than about 5 weight percent, and a melting point of about 20° to about 40° C., and wherein the triglyceride is an nutritionally superior fat which, when incorporated into the food product. provides excellent textural properties and does not significantly raise LDL-cholesterol levels in humans consuming the food product.

19. The composition according to claim 18, wherein at least two of the R, R', and R" groups are cis-asymmetric monounsaturated fatty acid resides of about 16 to about 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

20. The composition according to claim 18, wherein each of the R, R', and R" groups are cis-asymmetric monounsaturated fatty acid resides of about 16 to 24 carbons, and wherein each cis-asymmetric monounsaturated fatty acid residue, which may be the same or different, has a single double bond within about 2 to about 6 carbon atoms of either end of the cis-asymmetric monounsaturated fatty acid residue.

21. The composition according to claim 18, wherein the cis-asymmetric monounsaturated fatty acid residue is selected from the group consisting of cis-6-octadecenoic acid, cis-5-eicosenoic acid, cis-13-docosenoic acid, cis-15-tetracosenoic acid, and mixtures thereof.

22. The composition according to claim 18, wherein the triglyceride is selected from the group consisting of tripetroselinin, trieicosenoin, trinervonin, tridocosenoin, trierucin, and mixtures thereof.

23. The composition according to claim 18, wherein the composition contains about 2 to 90 weight percent of the triglyceride.

24. The composition according to claim 23, wherein the composition contains about 5 to 20 weight percent of the triglyceride.

25. The composition according to claim 21, wherein the composition contains about 2 to 90 weight percent of the triglyceride.

26. The composition according to claim 25, wherein the composition contains about 5 to 20 weight percent of the triglyceride.

27. The composition according to claim 22, wherein the composition contains about 2 to 90 weight percent of the triglyceride.

28. The composition according to claim 27, wherein the composition contains about 5 to 20 weight percent of the triglyceride.

* * * * *

UNITED STATES PATENT AND TRADEMARK OFFICE
CERTIFICATE OF CORRECTION

PATENT NO. : 5,959,131

DATED : September 28, 1999              Page 1 of 2

INVENTOR(S) : Blaurock, et al

It is certified that error appears in the above-identified patent and that said Letters Patent is hereby corrected as shown below:

Column 8, line 65, after "40° C." insert a comma (from Amendment A, page 4, claim 8, line 13).

Column 9 line 5 delete "resides", and insert --residues--.

Column 9 line 12 delete "resides", and insert --residues--.

Column 9, line 36, change "R"°" to --R"-- (from Amendment A, page 2, claim 2, line 36).

Column 9 line 52 delete "resides", and insert --residues--.

Column 9 line 60 delete "resides", and insert --residues--.

Column 10, line 5, change "Is" to --is-- (from Amendment A, page 18, claim 6, line 16).

Column 10 line 35 delete "resides", and insert --residues--.

Column 10 line 43 delete "resides", and insert --residues--.

UNITED STATES PATENT AND TRADEMARK OFFICE
CERTIFICATE OF CORRECTION

PATENT NO. : 5,959,131

DATED : September 28, 1999          Page 2 of 2

INVENTOR(S) : Blaurock, et al

It is certified that error appears in the above-identified patent and that said Letters Patent is hereby corrected as shown below:

Column 11, line 19, change "products." to --products,-- (from Amendment A, page 3, claim 16, line 14).

Column 11 line 24 delete "resides", and insert --residues--.

Column 11 line 32 delete "resides", and insert --residues--.

Signed and Sealed this

Third Day of April, 2001

Attest:

NICHOLAS P. GODICI

Attesting Officer          Acting Director of the United States Patent and Trademark Office